United States Patent [19]

Ioannidis et al.

[11] Patent Number: 4,481,541
[45] Date of Patent: Nov. 6, 1984

[54] CAMERA FOR CRT MONITOR

[75] Inventors: Kostas P. Ioannidis; David E. Stone, both of Houston, Tex.

[73] Assignee: Radx Corporation, Houston, Tex.

[21] Appl. No.: 464,374

[22] Filed: Feb. 7, 1983

[51] Int. Cl.³ .............................................. H04N 5/84
[52] U.S. Cl. ..................................... 358/244; 355/29; 355/72
[58] Field of Search ................. 358/244, 244.1, 244.2, 358/332, 304; 346/24; 354/203, 211; 355/28, 29, 72, 75; 226/195, 196

[56] References Cited

U.S. PATENT DOCUMENTS

| | | |
|---|---|---|
| 2,613,264 | 10/1952 | Haynes . |
| 3,184,753 | 5/1965 | Koster . |
| 3,311,918 | 3/1967 | Koster . |
| 3,466,389 | 9/1969 | Neiswander et al. . |
| 3,499,376 | 3/1970 | Swift ..................... 354/211 |
| 3,507,575 | 4/1970 | Soule et al. . |
| 3,684,365 | 8/1972 | Dahlquist et al. . |
| 3,743,412 | 7/1973 | Morse . |
| 3,786,182 | 1/1974 | Kaneko et al. . |
| 3,854,142 | 12/1974 | Whitley et al. . |
| 3,938,164 | 2/1976 | Ohnishi et al. . |
| 3,994,581 | 11/1976 | Hopkins et al. ..................... 355/72 |
| 4,027,315 | 5/1977 | Barney . |
| 4,039,746 | 8/1977 | Talbot . |
| 4,343,543 | 8/1982 | Schiff et al. ..................... 355/29 |
| 4,396,277 | 8/1983 | Hunt ..................... 354/211 |

Primary Examiner—Donald E. McElheny, Jr.
Attorney, Agent, or Firm—Vaden, Eickenroht, Thompson, Bednar & Jamison

[57] ABSTRACT

A camera for photographing the image on CRT monitors is disclosed that locates a magazine containing a roll of film below a vertical aperture plate and a cassette above the aperture plate to receive the exposed film so that the film exposed through the opening in the aperture plate will not sag and distort the image received from the lens due to gravity. Magnets hold a pressure plate against the aperture plate to keep the film flat and properly positioned against the aperture plate. Apparatus is provided to cut the film between the aperture plate and the cassette to allow the cassette to be removed from time to time to develop the exposed film contained therein.

3 Claims, 7 Drawing Figures

CAMERA FOR CRT MONITOR

This invention relates to cameras generally, but in particular to cameras for photographing the image on CRT monitors.

This invention has utility in many areas, but is particularly useful in connection with CRT monitors used in the medical field. For example, when doing a CAT scan, a doctor will observe each slice on a CRT. If he sees any abnormalities or for any reason desires a record of the image, he will activate a camera that will take a picture of a CRT monitor that is showing the same picture that he is looking at on his CRT.

Most of the present monitor cameras are constructed like view cameras. Two sheets of film are loaded into a cassette much like the film holders used with the old press cameras. The cassette is positioned over a horizontal aperture plate, the protective sheet protecting the film from light is removed, the film is exposed, and the protective sheet replaced. The cassette is then turned over and the procedure repeated to expose the outer sheet of film.

Other CRT monitor cameras have been used that have a roll of film that is moved in steps across a horizontal aperture plate like a roll camera.

The pictures taken are large being either 67.5 mm by 90 mm (2.66"×3.54") or 90 mm by 120 mm (3.54"×4.73"). The film is thick and heavy like that used for x-ray pictures. In the camera discussed above, the film extending across the opening in the aperture plate tends to sag due to its weight and can cause distortion of the picture.

It is an object of this invention to provide a camera for a CRT monitor wherein the film is provided from a magazine in a continuous roll of substantial length that travels from the magazine in a vertical direction past the aperture plate to a cassette on top of the camera, so that the film is flat as it passes the aperture plate resulting in a true picture of the image on the CRT.

It is another object of this invention to provide a camera for a CRT monitor wherein the film moves vertically past the aperture plate and is held in position against the aperture plate by a pressure plate urged toward the film in the aperture plate by magnetic forces that are sufficient to hold the film flat against the aperture plate while allowing the film to slide easily between the two plates.

It is a further object of this invention to provide improved film cutting apparatus located above the aperture plate to cut the film to allow a cassette containing exposed film to be removed from time to time for processing of the film and to be replaced by another cassette so the operation of the camera can continue.

These and other objects, advantages, and features of this invention will be apparent to those skilled in the art from a consideration of this specification including the attached drawings and appended claims.

Figure 1:
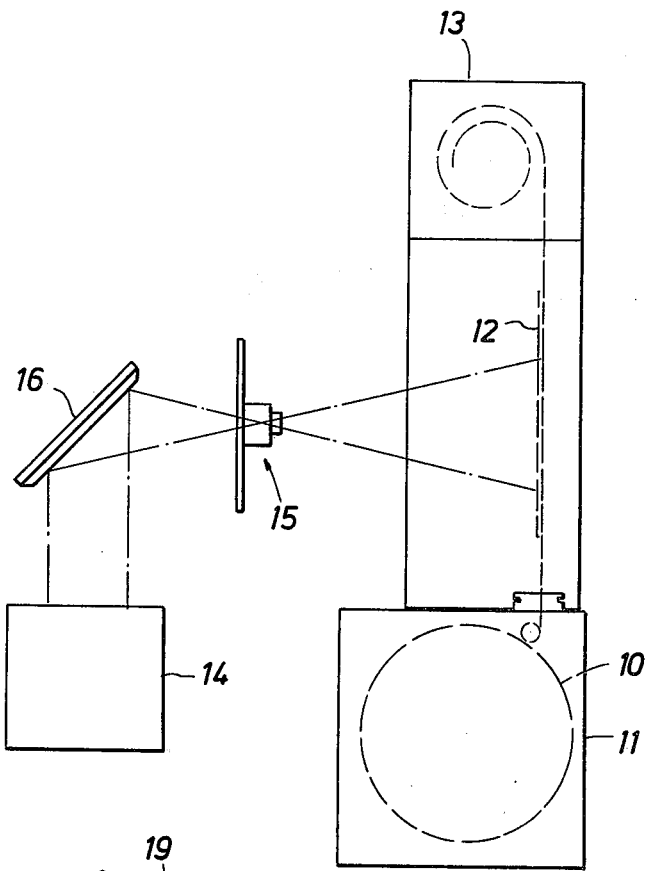
FIG. 1 is a schematic drawing of the arrangement of the components of the CRT camera of this invention showing the path taken by the film from the magazine past the aperture plate into the cassette on top of the camera.

As shown in FIG. 1, a roll of film 10 is mounted in magazine 11. Typically, the magazine is designed to handle a roll of photographic film or paper 500 feet long.

Figure 2:
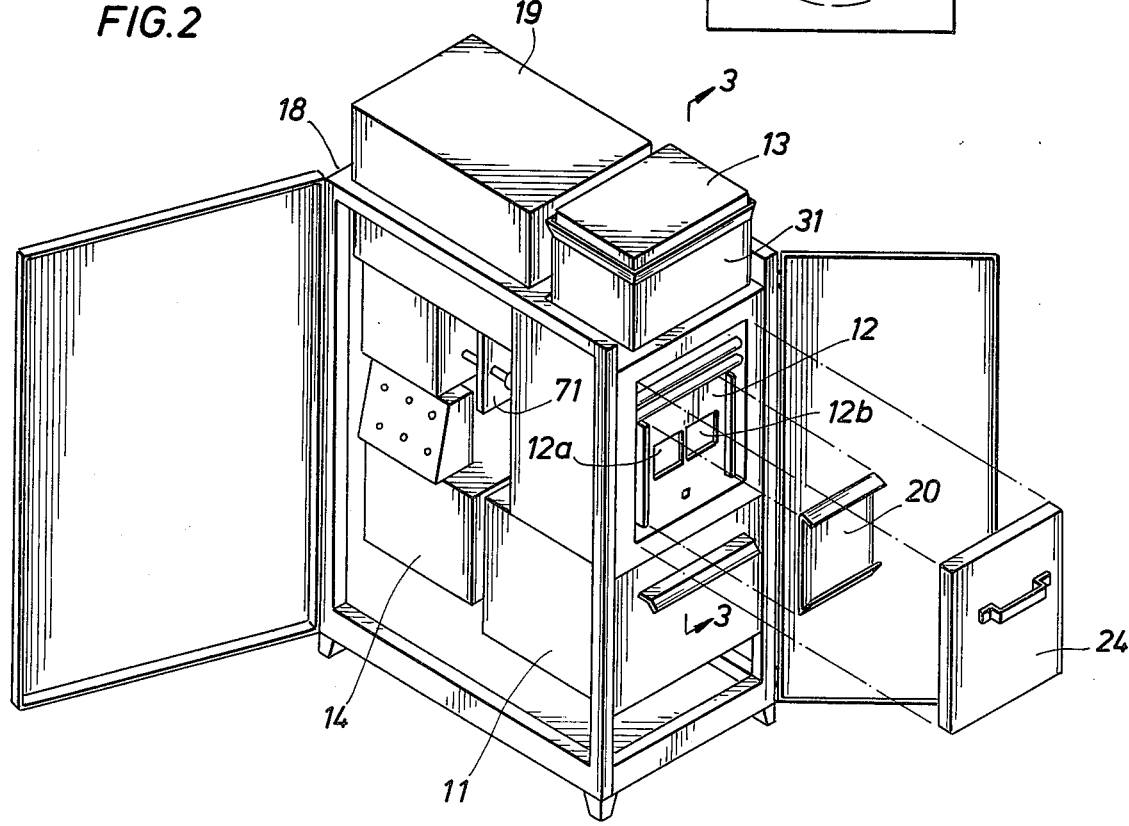
FIG. 2 is an isometric view of the camera with the doors of the housing open exposing the aperture plate and the position of the various components in the camera housing.

Presently, the maximum length of film available is 250 feet. Hereinafter both the photographic paper and film will be referred to simply as "film". The film is fed upwardly from magazine 11 past aperture plate 12 into cassette 13. The video image from CRT 14 is reflected through lens 15 by mirror 16 onto the film exposed through the opening in aperture plate 12, when the shutter of the camera is open. Mirror 16 allows the CRT, which is relatively heavy, to be located in the lower part of camera housing 18 as shown in FIG. 2. There it combines with the weight of the roll of film in the magazine to substantially lower the center of gravity of the camera and make it very stable.

In the commercial embodiment of this invention, everything is located in frame 18 with the exception of cassette 13 and control panel 19, which are located on top of the cabinet.

Pressure plate 20 holds the film flat against aperture plate 12. With aperture plate 12 attached to and supported by frame 18 and pressure plate 20 holding the film directly against the plate, and with the film moving vertically, there will be no tendency of the film to sag into openings 12a and 12b of the aperture plate causing distortion of the picture, as is the case in other cameras of this type. The aperature plate has two openings to allow two side-by-side pictures to be taken alternately.

Figure 3:
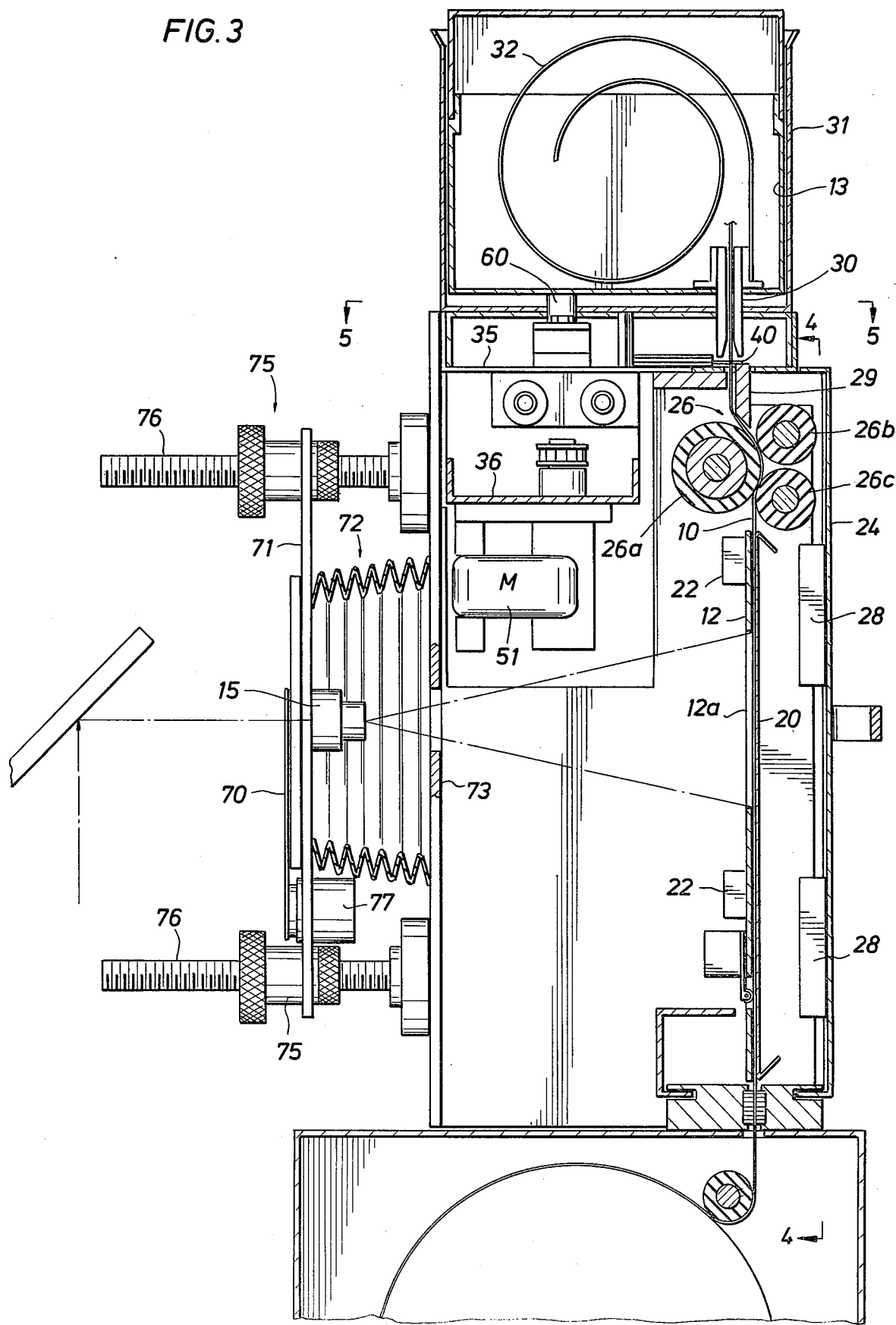
FIG. 3 is a sectional view taken along line 3—3 of FIG. 2.
Figure 4:
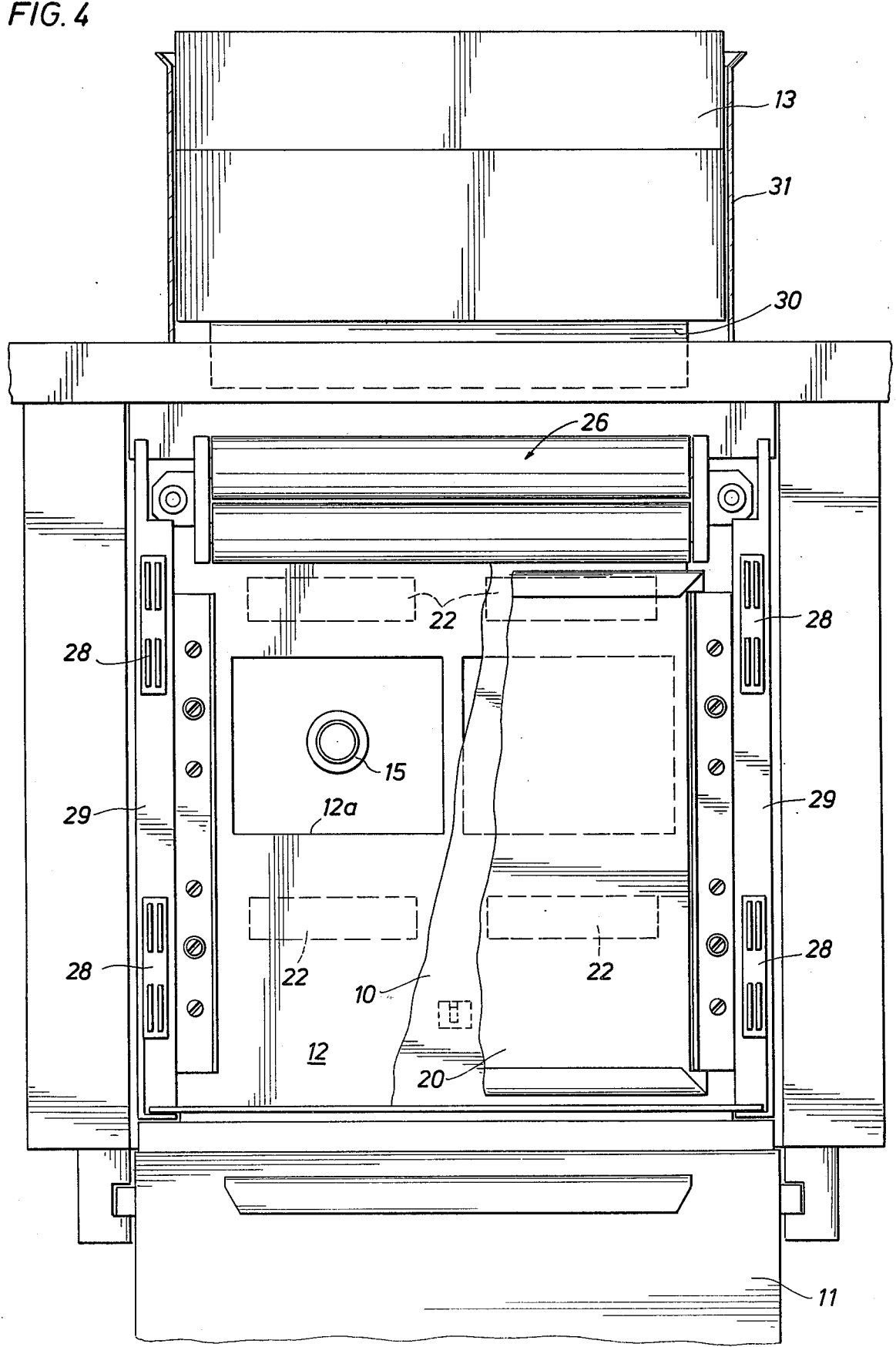
FIG. 4 is a sectional view taken along line 4—4 of FIG. 3.

Means are provided to urge pressure plate 20 toward aperture plate 12 with sufficient force to maintain the film flat against the aperture plate while allowing the film to slide easily between the two plates as it is moved upwardly from the magazine along substantially a straight line into the cassette mounted on top of the cabinet. In the embodiment shown, such means include permanent magnets 22 mounted on aperture plate 12, as seen in FIGS. 3 and 4. By using permanent magnets to urge the pressure plate toward the aperture plate, the force exerted by the plate against the aperture plate and the film is substantially constant. Also, it allows the plate to be quickly and easily removed and returned to its position holding the film against the aperture plate which must be done anytime a new roll of film is threaded into the camera. Cover 24 is designed to cover film path and roller assembly 26 to keep light from outside the housing from reaching the film. Cover 24 is also held in place by magnets 28 that are mounted on the front side of angle braces 29 located on opposite sides of the aperture plate. Both the pressure plate and the cover plate are, of course, made of ferromagnetic material.

Roller assembly 26 moves the film from the magazine, by the aperture plate where it is exposed, and into the cassette. Roller 26a, is driven by an electric motor (not shown). Roller 26a and idler rollers 26b and 26c are positioned to force the film to engage an extended area of roller 26a with a sufficient normal force to keep the film from slipping on the rollers.

As shown in FIG. 3, the rollers move the film upwardly past film guide 29 into cassette 13 through entrance slot 30 that extends through the bottom of cassette holder 31. The slot is lined with felt or the like to keep light from entering the cassette through the entrance slot, when the cassette is removed from the top of the cabinet. Coil spring 32 causes the film to coil up inside the spring as it moves upwardly into the cassette so that the film will not jam and a substantial length of film can be stored in the cassette. Usually, these cassettes are designed to store 25 or 35 feet of exposed film.

When the camera is used in connection with a medical survey, such as a CAT scan, it is desirable that after each patient has been examined the cassette containing the exposed film relative to that patient be removed to allow the film to be developed without delay. Therefore, means are provided for cutting the film between the film advancing rollers and the cassette to allow the cassette to be removed.

In the embodiment shown, such means are mounted on U-shaped support members 35 and 36 that extend across the upper portion of frame 18.

Figure 6:
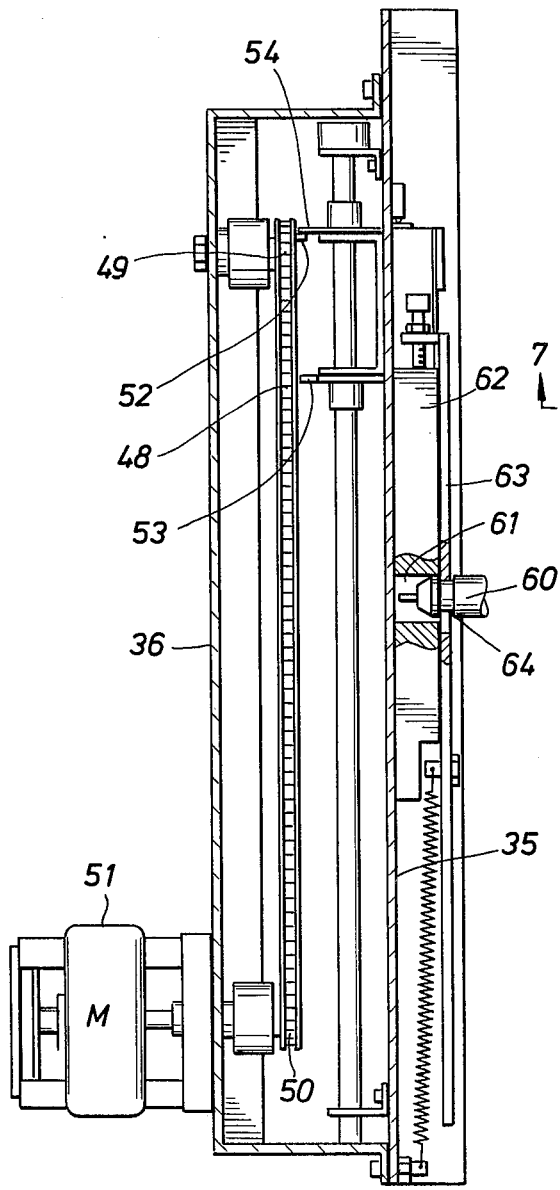
FIG. 6 is a sectional view taken along line 6—6 of FIG. 5.
Figure 5:
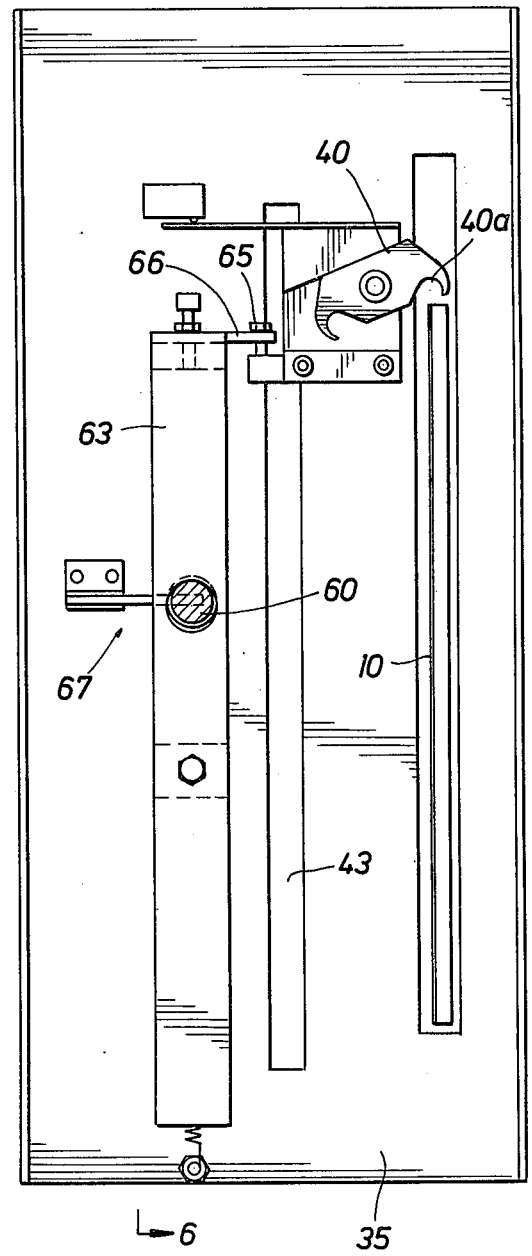
FIG. 5 is a sectional view taken along line 5—5 of FIG. 3.
Figure 7:
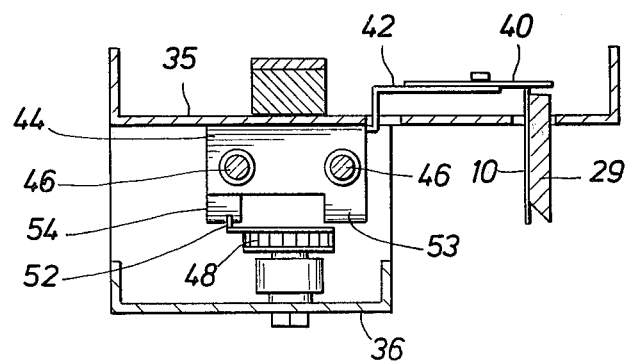
FIG. 7 is a sectional view taken along line 7—7 of FIG. 5.

Knife 40 is mounted on L-shaped arm 42 (FIG. 7), one leg of which extends through elongated slot 43 in support member 35 and is connected to U-shaped member 44. Two parallel rods 46 are attached to the underside of support member 35 and extend through openings in U-shaped bracket 44. The rods support the bracket for sliding movement below the support member. An endless flexible member is positioned below bracket 44 that has a pin for engaging the U-shaped bracket for moving the bracket along with knife 40 to cut the film and to return the knife and bracket to its starting point. As shown in FIGS. 6 and 7, roller chain 48 is mounted on spaced sprockets 49 and 50 for movement parallel to rods 46. The sprockets are mounted on support member 36. Sprocket 50 is rotated by motor 51. Pin 52 is carried by the chain and when the chain is moving from top to bottom as viewed in FIGS. 5 and 6, pin 52 will engage tab 53 on U-shaped bracket 44 and cause the knife to cut through the film. After the cut has been made, the pin will move around sprocket 50 and engage tab 54 on the other side of U-shaped bracket 43 and move the knife and bracket back to its starting point, at which time motor 51 will cut off.

To insure that the cassette is not prematurely removed from its position in light-free engagement with the top of the cabinet, lock pin 60 that is attached to the bottom of the cassette extends through an openings provided in the bottom of cassette holder 31 into opening 61 in anchor block 62. When so positioned, plate 63 engages groove 64 in the pin adjacent its end and holds the pin in the opening and the cassette from inadvertent removal from the housing until pin 60 is released. This occurs automatically after the knife has cut the film and is being returned to its original position. Bracket 44 will engage pin 65 and through arm 66 move plate 63 upwardly, as viewed in FIGS. 5 and 6, moving plate 63 out of engagement with groove 64 on the pin releasing the lock pin so that the cassette can be removed. Springs (not shown) will cause the cassette to jump up far enough for the lock pin to clear plate 63 as soon as the pin is released. Switch 67 tells the control panel that the cassette lock has been released and will prevent further operation of the camera until another cassette has been properly positioned in this cassette holder.

As stated above, two side-by-side pictures are made on the film as it passes the aperature plate. This is accomplished with two lens mounted side-by-side on a movable lens plate. Each has its own shutter. Only one lens and shutter is shown in the drawings (FIG. 3), but they are arranged the same so a description of one will suffice.

Lens 15 and shutter 70 are mounted on lens plate 71 (FIG. 3). It is surrounded by bellows-type light shield 72, which extends between lens plate 71 and mounting plate 73. Lens plate 71 can be moved toward and away from film 10 as required to focus the image from the CRT properly on the film by adjusting nut 75 mounted on threaded rod 76. Shutter 70 is moved from its position closing off the light to lens 15 by rotary solenoid 77. The length of time that the shutter is open is adjustable so that the film can be exposed for the proper length of time depending on the film speed and the amount of light produced by the CRT.

In operation, first one shutter is opened then the other after which the film is advanced.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many other embodiments may be made of the invention without departing from the scope thereof, it is to be understood that all matter herein set forth or shown in the accompanying drawings is to be interpreted as illustrative and not in a limiting sense.

I claim:

1. A camera for photographing the image on a CRT monitor comprising a housing, a CRT monitor mounted in the housing, a magazine for holding a roll of film, a vertical aperture plate mounted above the magazine, a pressure plate for holding the film against the aperture, magnetic means for urging the pressure plate and the aperture plate together with sufficient force to hold the film flat against the aperture plate while allowing the film to be moved between the aperture plate and the pressure plate, a lens and shutter assembly positioned to focus the image on the CRT monitor on the film through the aperture of the aperture plate when the shutter is open, a removable cassette mounted above the film magazine and the plate to receive the exposed film, and means for cutting the film between the film advancing means and the cassette to allow the cassette to be removed and the exposed film in the cassette to be developed while another cassette is being loaded with exposed film from the magazine.

2. The camera of claim 1 in which the pressure plate is held against the film by permanent magnets.

3. The camera of claim 1 in which the cutting means includes a knife having a blade for cutting the film, means for moving the blade laterally through the film including a bracket supporting the knife, guide members for supporting the bracket for sliding movement along the guide members to move the blade through the film, and an endless flexible member having a pin for engaging the bracket and move it with the flexible member to move the knife blade through the film and to return the bracket to its starting point, and means to move the flexible member to so move the bracket when it is desired to cut the film.

* * * * *